US008721457B2

(12) United States Patent
Wachtfogel et al.

(10) Patent No.: US 8,721,457 B2
(45) Date of Patent: May 13, 2014

(54) SECURE OFFLINE INTERACTIVE GAMBLING

(75) Inventors: David Mordechai Wachtfogel, Jerusalem (IL); Reuven Wachtfogel, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 2561 days.

(21) Appl. No.: 10/495,724

(22) PCT Filed: Dec. 27, 2002

(86) PCT No.: PCT/IL02/01047
§ 371 (c)(1), (2), (4) Date: Oct. 25, 2004

(87) PCT Pub. No.: WO03/058566
PCT Pub. Date: Jul. 17, 2003

(65) Prior Publication Data
US 2005/0107157 A1 May 19, 2005

Related U.S. Application Data

(60) Provisional application No. 60/346,506, filed on Jan. 7, 2002.

(51) Int. Cl.
*A63F 13/00* (2014.01)

(52) U.S. Cl.
USPC .................... 463/43; 463/16; 463/25; 463/42

(58) Field of Classification Search
USPC ........ 463/9, 12, 13, 16, 25, 29, 40, 42, 43, 44
See application file for complete search history.

(56) References Cited

U.S. PATENT DOCUMENTS 4,652,998 A * 3/1987 Koza et al. ...................... 463/26
4,764,666 A 8/1988 Bergeron
(Continued)

FOREIGN PATENT DOCUMENTS

EP 0 971 327 1/2000
EP 0971327 1/2000
(Continued)

OTHER PUBLICATIONS

Office Action dated Jan. 27, 2008 and free English translation.
(Continued)

*Primary Examiner* — James S McClellan
(74) *Attorney, Agent, or Firm* — Ladas & Parry LLP

(57) ABSTRACT

A secure offline interactive gambling system includes a subscriber unit operative, through interaction with a user, to execute an offline interactive gambling application, a secure processor operatively associated with the subscriber unit and a central gambling facility. The secure processor includes a random gambling input generator operative to randomly or pseudo-randomly generate gambling input to the offline interactive gambling application during execution of the offline interactive gambling application, and a secure memory operatively associated with the random gambling input generator and operative to securely store information related to the execution of the offline interactive gambling application. The information, that is securely stored and the user cannot modify, typically includes the gambling input and user selections made in response to the gambling input and can be used to derive at least one result of the offline interactive gambling application. The information is transmitted to the central gambling facility that re-executes the offline interactive gambling application with the information replacing the gambling input actually generated and the user selections actually entered. By re-executing the offline interactive gambling application at the central gambling facility the at least one result is derived and validated and the user may be credited or debited based on the at least one result. Related apparatus and method are also described.

21 Claims, 3 Drawing Sheets

(56) References Cited

U.S. PATENT DOCUMENTS

| | | | |
|---|---|---|---|
| 4,882,473 | A | 11/1989 | Bergeron et al. |
| 5,276,312 | A | 1/1994 | McCarthy |
| 5,356,144 | A | 10/1994 | Fitzpatrick et al. |
| 5,539,450 | A | 7/1996 | Handelman |
| 5,592,212 | A | 1/1997 | Handelman |
| 5,643,086 | A | 7/1997 | Alcorn et al. |
| 5,674,128 | A | 10/1997 | Holch et al. |
| 5,768,382 | A | 6/1998 | Schneier et al. |
| 5,779,549 | A | 7/1998 | Walker et al. |
| 5,787,156 | A | 7/1998 | Katz |
| 5,800,269 | A | 9/1998 | Holch et al. |
| 5,850,447 | A | 12/1998 | Peyret |
| 5,851,149 | A | 12/1998 | Xidos et al. |
| 5,871,398 | A | 2/1999 | Schneier et al. |
| 6,024,640 | A | 2/2000 | Walker et al. |
| 6,071,190 | A | 6/2000 | Weiss et al. |
| 6,089,982 | A | 7/2000 | Holch et al. |
| 6,234,898 | B1 | 5/2001 | Belamant et al. |
| 6,280,328 | B1 | 8/2001 | Holch et al. |
| 6,312,336 | B1 | 11/2001 | Handelman et al. |
| 6,364,769 | B1 | 4/2002 | Weiss et al. |
| 6,579,182 | B1 | 6/2003 | Orus et al. |
| 2001/0041612 | A1 | 11/2001 | Garahi et al. |
| 2001/0046894 | A1 | 11/2001 | Lemay et al. |
| 2001/0049720 | A1 | 12/2001 | Eyer |
| 2002/0010013 | A1 | 1/2002 | Walker et al. |
| 2002/0032057 | A1 | 3/2002 | Ebihara |
| 2002/0052229 | A1 * | 5/2002 | Halliburton et al. .............. 463/9 |

FOREIGN PATENT DOCUMENTS

| | | |
|---|---|---|
| GB | 1 287 304 | 8/1972 |
| GB | 1287304 | 8/1972 |
| WO | 99/39312 | 8/1999 |
| WO | 01/56252 | 8/2001 |
| WO | 01/75545 A2 | 10/2001 |

OTHER PUBLICATIONS

Menezes, A. et al. "Pseudorandom Bits and Sequences", Chapter 5, pp. 169-190, *Handbook of Applied Cryptography*, CRC Press, Inc., 1997.

Summons to Attend Oral Proceedings Issued Dec. 1, 2010.

* cited by examiner

SECURE OFFLINE INTERACTIVE GAMBLING

RELATED APPLICATION INFORMATION

The present application is a 35 USC §371 application of PCT/IL02/01047, filed on 27 Dec. 2002 and titled "Secure Offline Interactive Gambling", which was published on 17 Jul. 2003 in the English language with International Publication Number WO 03/058566 A2. The present application claims the benefit of the filing date of U.S. Provisional Patent Application Ser. No. 60/346,506, filed 7 Jan. 2002, and titled "Secure Offline Interactive Gambling".

FIELD OF THE INVENTION

The present invention relates to interactive gambling in general, and in particular to interactive gambling for use with interactive television (ITV).

BACKGROUND OF THE INVENTION

Interactive gambling applications, including interactive gambling applications for use with interactive television (ITV), are known in the art. One such system is described in published PCT Patent Application WO 99/39312, assigned to NDS Ltd.

Some aspects of technologies and related art that may be useful in understanding the present invention are described in the following publications:

- U.S. Pat. No. 6,234,898 to Belamant et al, which describes a system for controlling a gaming operation that includes a secure processing and memory apparatus in the form of a smart card, together with non-secure input and display means connectable to the smart card;
- U.S. Pat. No. 5,643,086 to Alcorn et al, which describes an electronic casino gaming system that includes an unalterable ROM for storing a casino game authentication program, including a message digest algorithm program, a decryption program and a decryption key;
- U.S. Pat. No. 5,871,398 to Schneier et al, which describes an off-line remote lottery system which enables players to purchase instant-type lottery game outcomes from a randomized prize data stream in a central computer, and view the outcomes on remotely disposed gaming computers which do not require an on-line connection during play;
- U.S. Pat. No. 5,768,382 to Schneier et al, which describes a computer device and method for encoding a message corresponding to an outcome of a computer game, and a computer device and method for decoding the message to detect a fraudulent outcome;
- U.S. Pat. No. 5,276,312 to McCarthy, which describes a wagering system for random drawing lotteries that has a central data processor managing acceptance of player entries and payout authorization;
- U.S. Pat. No. 5,851,149 to Xidos et al, which describes a distributed gaming system that provides a user with remote location gaming, for example from within a hotel room;
- U.S. Pat. No. 5,787,156 to Katz, which describes a telephonic-interface lottery system D that interfaces with a multiplicity of individual terminals T1-Tn of a telephone network facility C to enable lottery players to call and play for at least one additional chance to possibly win by dialing a pay-to-dial telephone number indicated on a "scratch-off" or online game lottery ticket for use in the system;

- U.S. Pat. Nos. 5,674,128, 5,800,269, 6,089,982 and 6,280,328 to Holch et al, which describe a coinless video game system that includes a plurality of electronic video game terminals, a game server corresponding to each player terminal, and a central control network for administering and controlling games and player accounts;
- U.S. Pat. No. 6,312,336 to Handelman et al, which describes a gaming guide method including providing first gaming guide information from a television network and second gaming guide information from a computer based communication network, and displaying simultaneously at least a portion of the first gaming guide information and at least a portion of the second gaming guide information;
- U.S. Pat. Nos. 6,071,190 and 6,364,769 to Weiss et al, which describe a gaming device security system which includes two processing areas linked together and communicating critical gaming functions via a security protocol wherein each transmitted gaming function includes a specific encrypted signature to be decoded and validated before being processed by either processing area;
- U.S. Pat. No. 6,024,640 to Walker et al, which describes an off-line remote lottery system which enables players to purchase instant-type lottery game outcomes from a randomized prize datastream in a central computer and view the outcomes on remotely disposed gaming computers which do not require an on-line connection to the central computer during play;
- U.S. Pat. No. 5,779,549 to Walker et al, which describes a method and a system for a distributed electronic tournament system in which many remotely located players participate in a tournament through input/output devices connected to a central controller which manages the tournament;
- U.S. Pat. No. 4,882,473 to Bergeron et al, which describes an on-line wavering system with programmable game entry cards including cards having on-card data storage for value tokens and data uniquely related to the player and including cards with on-card data storage for operator security data;
- U.S. Pat. No. 4,764,666 to Bergeron et al, which describes an on-line wagering system with programmable game entry cards including cards having on-card data storage for value tokens and data uniquely related to the player;
- U.S. Pat. No. 5,356,144 to Fitzpatrick et al, which describes a hand-held lottery number generating device;
- U.S. Pat. Nos. 5,539,450 and 5,592,212 to Handelman et al, which describe a pay television gaming system including a pay television network having a multiplicity of subscriber units each including a television, receiving apparatus for receiving gaming inputs from the multiplicity of subscriber units, transmitting apparatus for transmitting to the multiplicity of subscriber units information relating to gaming results and accounting apparatus for settling gaming debts and winnings via the pay television network;
- Published U.S. Patent Application 2001/0046894 of Lemay et al, which describes a key for a gaming machine for authorizing various functions via a control system of the gaming machine;

Published U.S. Patent Application 2002/0010013 of Walker et al, which describes systems and methods for facilitating games of skill for prizes played via a communication network;

Published U.S. Patent Application 2002/0032057 of Ebihara, which describes a game-program distribution system that includes a broadcasting station for transmitting a signal containing first data representative of a television program and second data representative of a game program related to the television program;

Published U.S. Patent Application 2001/0041612 of Garahi, which describes systems and methods for providing a consistent wagering interface to a variety of platforms; and

*Handbook of Applied Cryptography*, by Alfred J. Menezes, Paul C. van Oorschot and Scott A. Vanstone, CRC Press LLC, 1997, Chapter 5.

The disclosures of all references mentioned above and throughout the present specification are hereby incorporated herein by reference.

SUMMARY OF THE INVENTION

The present invention, in preferred embodiments thereof, seeks to provide apparatus and method for carrying out secure offline interactive gambling. The term "gambling" is used throughout the specification and claims in a broad sense to include any type of activity or gaming that involves, at least partially, chance, particularly but not necessarily, activity or gaming that results in winning or losing prizes, money, benefits or equivalents thereof.

The term "interactive gambling" is used throughout the specification and claims to refer to any form of gambling in which a gambler makes interactive decisions and selections while gambling. For example and without limiting the generality of the foregoing, the term "interactive gambling" includes participating in gambling games such as "Blackjack" and "Poker" in which the gambler draws playing cards and responds to game challenges. It is appreciated that secure offline interactive gambling, in certain preferred embodiments of the present invention, may especially be useful in interactive television (ITV) gambling applications.

In general, as described in more detail below, the present invention, in preferred embodiments thereof, makes use of three cooperating components: an offline interactive gambling application; a re-executed version of the offline interactive gambling application; and a secure processor. The term "re-execute" in all of its grammatical forms in association with an application is used throughout the specification and claims to refer to a repeated execution of the very same application or a portion thereof, or to execution of a corresponding verification application that provides results identical, or substantially identical, to results obtained by execution of the application.

The offline interactive gambling application is preferably executed in order to enable a user to gamble. Interaction of the user while the offline interactive gambling application is executed is considered insecure because the user may try to tamper with the application. Therefore, the secure processor is used to randomly or pseudo-randomly generate gambling input to the offline interactive gambling application during execution of the offline interactive gambling application. The secure processor also preferably securely stores information related to the execution of the offline interactive gambling application. The information may preferably include a log of the gambling input as well as a log of user selections made in response to the gambling input. This information, which is securely stored and which the user preferably cannot modify, can be used to derive at least one result of the offline interactive gambling application.

After execution of the offline interactive gambling application, the user may be locally notified by the offline interactive gambling application of the at least one result. However, the at least one result is not considered to be final until the information is validated. Therefore, the information stored in the secure processor is transmitted to a secure verification component situated, for example and without limiting the generality of the foregoing, in a central gambling facility such as a headend. The secure verification component in the central gambling facility preferably re-executes the offline interactive gambling application with the information received from the secure processor replacing the gambling input actually generated and the user selections actually entered. The offline interactive gambling application re-executed in such a form is the re-executed version of the offline interactive gambling application and it is typically a secure application.

Through re-execution of the offline interactive gambling application the central gambling facility preferably securely derives and determines the at least one result of the offline interactive gambling application. The central gambling facility may also preferably determine winnings or losses of the user based on the at least one result, and the user may receive from the central gambling facility a validated notice of the at least one result and be credited or debited in response to a determination of the winnings or losses respectively.

There is thus provided in accordance with a preferred embodiment of the present invention a secure offline interactive gambling system including: a subscriber unit operative, through interaction with a user, to execute an offline interactive gambling application, a secure processor operatively associated with the subscriber unit and including: a random gambling input generator operative to randomly or pseudo-randomly generate gambling input to the offline interactive gambling application during execution of the offline interactive gambling application, and a secure memory operatively associated with the random gambling input generator and operative to securely store information related to the execution of the offline interactive gambling application, the information including information from which at least one result of the offline interactive gambling application can be derived, and a central gambling facility operative to receive the information from the secure processor, to check the information and to decide the at least one result of the offline interactive gambling application.

The information related to the execution of the offline interactive gambling application may preferably includes a log of at least some or all user selections made in response to the gambling input during execution of the offline interactive gambling application. The information related to the execution of the offline interactive gambling application may also preferably include a log of at least some or all of the gambling input generated by the random gambling input generator during execution of the offline interactive gambling application.

Additionally, the system may also preferably include a communication interface operatively associated with the subscriber unit and the secure processor and operative to securely transmit the information related to the execution of the offline interactive gambling application to the central gambling facility. The communication interface is also preferably operative to receive indications of credit or debit.

Preferably, the subscriber unit includes a set-top box (STB) and the secure processor is included in a removable security element. The removable security element preferably includes a smart card.

The offline interactive gambling application preferably includes a game that is at least partially based on chance. The game preferably includes at least one of the following: a game of Poker, a game of Blackjack, and a Roulette game.

Preferably, the central gambling facility is included in a headend. The central gambling facility is preferably operative to check the information and to decide the at least one result by re-executing the offline interactive gambling application with the information replacing the gambling input and user selections made in response to the gambling input.

Preferably, the central gambling facility re-executes the offline interactive gambling application by performing at least one of the following: a repeated execution of a portion of the offline interactive gambling application, a repeated execution of the entire offline interactive gambling application, and execution of a corresponding verification application that provides results substantially identical to results obtained by execution of the offline interactive gambling application.

The central gambling facility preferably re-executes the offline interactive gambling application in a secure mode.

There is also provided in accordance with a preferred embodiment of the present invention a central gambling facility in a gambling system, the central gambling facility including: a central gambling facility communication interface operative to receive from a secure processor associated with a subscriber unit of the gambling system information including the following: gambling input randomly or pseudo-randomly generated for an offline interactive gambling application during execution of the offline interactive gambling application, and user selections made by a user in response to the gambling input during execution of the offline interactive gambling application, and a processing unit operatively associated with the central gambling facility communication interface and operative to check the information and to derive from the information at least one result of the offline interactive gambling application.

The processing unit is preferably operative to check the information and to derive the at least one result by re-executing the offline interactive gambling application with the information replacing the gambling input and the user selections. Preferably, the processing unit re-executes the offline interactive gambling application by performing at least one of the following: a repeated execution of a portion of the offline interactive gambling application, a repeated execution of the entire offline interactive gambling application, and execution of a corresponding verification application that provides results substantially identical to results obtained by execution of the offline interactive gambling application.

The processing unit preferably re-executes the offline interactive gambling application in a secure mode.

Preferably, the processing unit is also operative to determine winnings or losses of the user resulting from execution of the offline interactive gambling application. The processing unit is also preferably operative to generate indications of credit or debit for the user in response to a determination of the winnings or losses respectively and to respectively provide the indications of credit or debit to the secure processor.

Further in accordance with a preferred embodiment of the present invention there is also provided a secure offline interactive gambling method including: executing an offline interactive gambling application, randomly or pseudo-randomly generating gambling input to the offline interactive gambling application during execution of the offline interactive gambling application, securely storing information related to the execution of the offline interactive gambling application, the information including information from which at least one result of the offline interactive gambling application can be derived, securely transmitting the information related to the execution of the offline interactive gambling application to a central gambling facility, checking the information at the central gambling facility, and deciding, at the central gambling facility, the at least one result of the offline interactive gambling application based on the checking.

The checking and the deciding preferably include re-executing the offline interactive gambling application with the information replacing the gambling input and user selections made in response to the gambling input. The re-executing preferably includes at least one of the following: repeating execution of a portion of the offline interactive gambling application, repeating execution of the entire offline interactive gambling application, and executing a corresponding verification application that provides results substantially identical to results obtained by execution of the offline interactive gambling application.

The re-executing also preferably includes re-executing the offline interactive gambling application in a secure mode.

Preferably, the securely storing includes securely storing a log of some or all user selections made in response to the gambling input during execution of the offline interactive gambling application. The securely storing also preferably includes securely storing a log of some or all of the gambling input generated during execution of the offline interactive gambling application.

Additionally, the method also includes determining at the central gambling facility, based on the at least one result, winnings or losses of a user resulting from execution of the offline interactive gambling application. Further, the method also includes generating indications of credit or debit for the user in response to a determination of the winnings or losses respectively and transmitting the indications of credit or debit to the user.

The method also preferably includes statistically analyzing the log to identify improbable winning rates indicating fraud in the execution of the offline interactive gambling application. The statistically analyzing preferably includes checking to identify a spike in winning rate of a single user or a plurality of users.

When the log is a fixed-length log and the information cannot be included in a single log, the method also preferably includes opening a new log when a preceding log associated with the offline interactive gambling application reaches it end, the new log having a log identity which is identical to a log identity of the preceding log.

Still further in accordance with a preferred embodiment of the present invention there is provided a secure offline interactive gambling system including: a subscriber unit operative to insecurely store an offline interactive gambling application including all rules governing execution of the offline interactive gambling application, and, through interaction with a user, to execute the offline interactive gambling application, and a secure processor operatively associated with the subscriber unit and including: a random gambling input generator operative to randomly or pseudo-randomly generate gambling input to the offline interactive gambling application during execution of the offline interactive gambling application, and a secure memory operatively associated with the random gambling input generator and operative to securely store information related to the execution of the offline interactive gambling application, the information including information from which at least one result of the offline interactive gambling application can be derived.

Preferably, the information related to the execution of the offline interactive gambling application includes a log of at least some or all user selections made in response to the gambling input during execution of the offline interactive gambling application. The information related to the execution of the offline interactive gambling application also preferably includes a log of at least some or all of the gambling input generated by the random gambling input generator during execution of the offline interactive gambling application.

Additionally, the system includes a communication interface operatively associated with the subscriber unit and the secure processor and operative to securely transmit the information related to the execution of the offline interactive gambling application. The communication interface is also preferably operative to receive indications of credit or debit.

Preferably, the subscriber unit includes a set-top box (STB) and the secure processor is included in a removable security element. The removable security element preferably includes a smart card.

Preferably the offline interactive gambling application includes a game that is at least partially based on chance. The game preferably includes at least one of the following: a game of Poker, a game of Blackjack, and a Roulette game.

The system also preferably includes a central gambling facility operative to check the information and to decide the at least one result of the offline interactive gambling application. The central gambling facility is preferably operative to check the information and to decide the at least one result by re-executing the offline interactive gambling application with the information replacing the gambling input and user selections made in response to the gambling input. The central gambling facility preferably re-executes the offline interactive gambling application by performing at least one of the following: a repeated execution of a portion of the offline interactive gambling application, a repeated execution of the entire offline interactive gambling application, and execution of a corresponding verification application that provides results substantially identical to results obtained by execution of the offline interactive gambling application.

Preferably, the central gambling facility re-executes the offline interactive gambling application in a secure mode.

Further in accordance with a preferred embodiment of the present invention there is provided a secure offline interactive gambling method including: insecurely storing an offline interactive gambling application including all rules governing execution of the offline interactive gambling application, executing the offline interactive gambling application through interaction with a user, randomly or pseudo-randomly generating gambling input to the offline interactive gambling application during execution of the offline interactive gambling application, and securely storing information related to the execution of the offline interactive gambling application, the information including information from which at least one result of the offline interactive gambling application can be derived.

Preferably, the securely storing includes securely storing a log of at least some or all user selections made in response to the gambling input during execution of the offline interactive gambling application. The securely storing also preferably includes securely storing a log of at least some or all of the gambling input generated during execution of the offline interactive gambling application.

Additionally, the method also preferably includes securely transmitting the information related to the execution of the offline interactive gambling application. Further, the method also includes receiving indications of credit or debit.

Preferably, the offline interactive gambling application includes a game that is at least partially based on chance. The game preferably includes at least one of the following: a game of Poker, a game of Blackjack, and a Roulette game.

The method also preferably includes checking the information and deciding the at least one result of the offline interactive gambling application at a central gambling facility. The checking and the deciding preferably include re-executing the offline interactive gambling application with the information replacing the gambling input and user selections made in response to the gambling input. The re-executing preferably includes at least one of the following: repeating execution of a portion of the offline interactive gambling application, repeating execution of the entire offline interactive gambling application, and executing a corresponding verification application that provides results substantially identical to results obtained by execution of the offline interactive gambling application.

Preferably, the re-executing includes re-executing the offline interactive gambling application in a secure mode.

BRIEF DESCRIPTION OF THE DRAWINGS AND APPENDIX

The present invention will be understood and appreciated more fully from the following detailed description, taken in conjunction with the drawings in which.

DETAILED DESCRIPTION OF A PREFERRED EMBODIMENT

Figure 1:
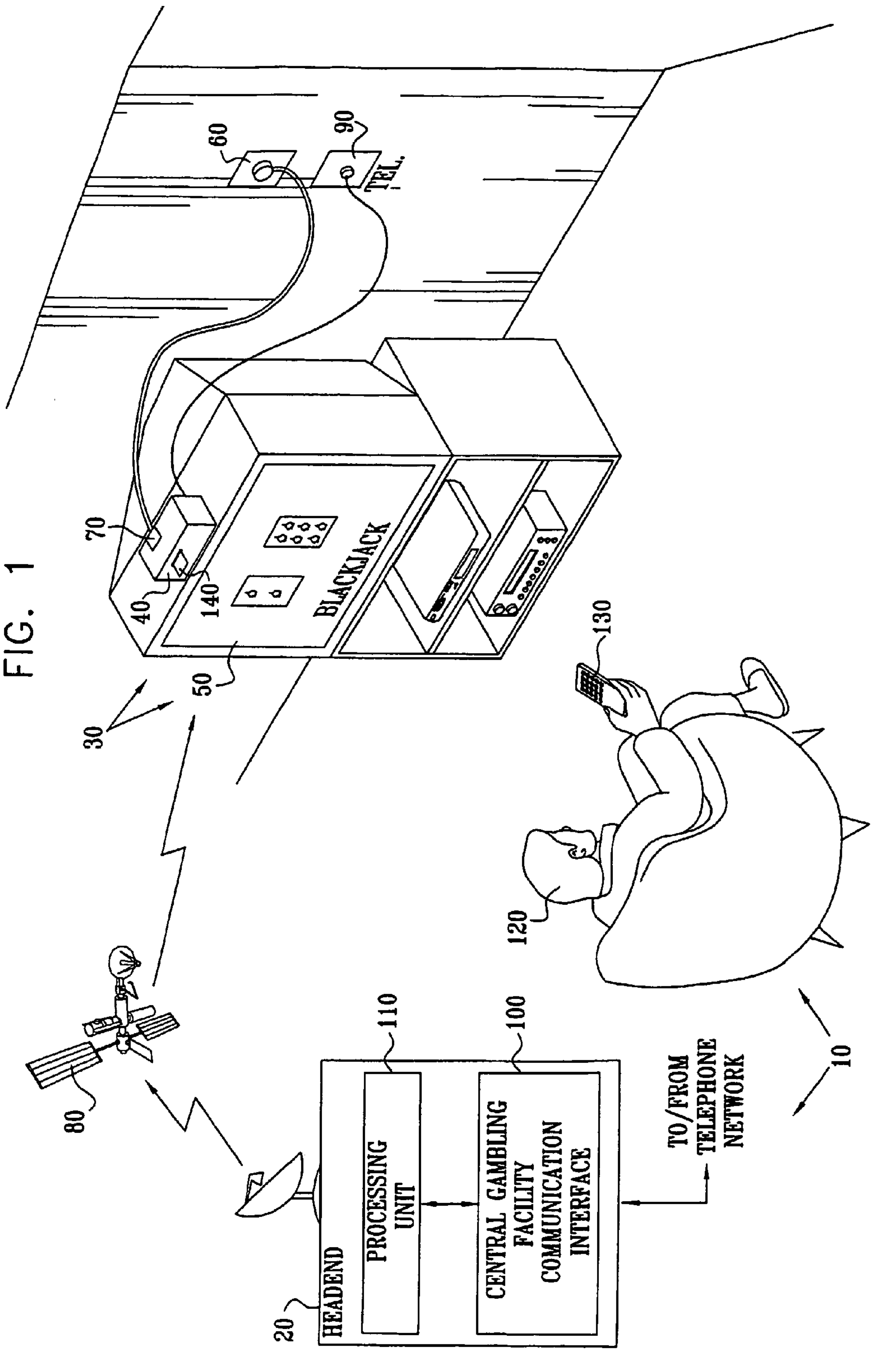
FIG. 1 is a simplified pictorial illustration of a gambling system constructed and operative in accordance with a preferred embodiment of the present invention.

Reference is now made to FIG. 1, which is a simplified pictorial illustration of a gambling system 10 constructed and operative in accordance with a preferred embodiment of the present invention.

The gambling system 10 may especially be useful in enabling the use of interactive television (ITV) gambling applications that may preferably include secure offline interactive gambling applications such as games that are at least partially based on chance, as described below. Therefore, the gambling system 10 is shown by way of example in FIG. 1 and described below as a television gambling system that is used by users that are subscribers to television services. However, the gambling system 10 may alternatively be any other suitable gambling system such as a telephone gambling system that employs a GSM cellular telephone network, a stand-alone system dedicated to gambling, or a computer-based gambling system; the example of a television gambling system is not meant to be limiting.

The gambling system 10 preferably includes a central gambling facility that may, for example and without limiting the generality of the description, be located at or comprised in a headend 20 that provides television services to the users. The headend 20 preferably communicates with a plurality of subscriber units 30, but for simplicity and without limiting the generality of the foregoing, only one subscriber unit 30 is depicted in FIG. 1.

Each subscriber unit 30 preferably includes a set-top box (STB) 40 that is operatively associated with a television 50 and is electrically powered via a wall outlet (not shown). The STB 40 may preferably receive television transmissions from the headend 20, preferably via an outlet 60 of a radio frequency (RF) antenna or a coaxial cable feed (both not shown) as is well known in the art.

Preferably, the STB 40 may transmit to the headend 20, preferably via a communication interface 70, upstream transmissions related to an offline interactive gambling application executed by the STB 40. The STB 40 may also receive from the headend 20, preferably via the communication interface 70, downstream transmissions related to or in response to the upstream transmissions.

In a case where the television transmissions are provided via satellite and received by the RF antenna, the downstream transmissions may also be provided via satellite. In such a case, the communication interface 70 may preferably use a telephone link of a telephone network for transmitting the upstream transmissions related to the offline interactive gambling application to the headend 20. Alternatively, the telephone link may also be used for transmitting the downstream transmissions from the headend 20 to the STB 40. Further alternatively, the communication interface 70 may use a VSAT (Very Small Aperture Terminal) link for transmitting the upstream transmissions related to the offline interactive gambling application to the headend 20.

In a case where the television transmissions are provided via coaxial cables and the coaxial cable feed enables two-way communication over the coaxial cables, the television transmissions, the upstream transmissions, and the downstream transmissions may all be communicated over the coaxial cables. In such a case, the communication interface 70 may preferably use the coaxial cable feed for the upstream and downstream transmissions. Cable systems allowing two-way communication are well known in the art.

By way of example, in the embodiment depicted in FIG. 1 the television transmissions are provided via a satellite 80, the upstream transmissions are transmitted to the headend 20 via a telephone link 90 of a telephone network (not shown), and the headend 20 includes a central gambling facility communication interface 100 that receives the upstream transmissions and transmits the downstream transmissions via the telephone network. The example of FIG. 1 is not meant to be limiting.

The upstream transmissions received via the communication interface 100 are preferably processed by a processing unit 110 in the headend 20 that operates, inter alia, as a secure verification component.

The subscriber unit 30 is preferably operated by a user 120 who may be, for example, a subscriber of television services received from the headend 20. The user 120 may preferably operate the subscriber unit 30 by interacting with the subscriber unit 30 via a user interface such as a remote control 130.

Preferably, the subscriber unit 30 executes, through interaction with the user 120, the offline interactive gambling application. In this respect, it is noted that the offline interactive gambling application including all rules governing execution of the application is preferably downloaded to the subscriber unit 30 before execution of the application and stored in the subscriber unit 30 in anticipation for execution. The offline interactive gambling application including the rules governing execution of the application being downloaded to the subscriber unit 30 and stored therein is preferably insecure. A memory (not shown) in the subscriber unit 30 in which the offline interactive gambling application including the rules governing execution of the application is stored is also preferably insecure. The reason why the memory and the offline interactive gambling application including the rules governing execution of the application are insecure is that security is maintained through cooperation with the headend 20 as described below.

Preferably, the user 120 interacts with the subscriber unit 30 to respond to gambling input generated during execution of the offline interactive gambling application as further described below.

The STB 40 may preferably be associated with a secure processor 140 that may preferably be implemented in a conventional security element. The security element may be comprised in the STB 40 or alternatively implemented in a removable form such as, for example, in a conventional smart card as is well known in the art. When associated with the STB 40, the secure processor 140 cooperates with the subscriber unit 30 in execution of the offline interactive gambling application and with the headend 20 as described below. By way of example and without limiting the generality of the foregoing, the secure processor 140 is implemented in a smart card in the embodiment depicted in FIG. 1.

Figure 2:
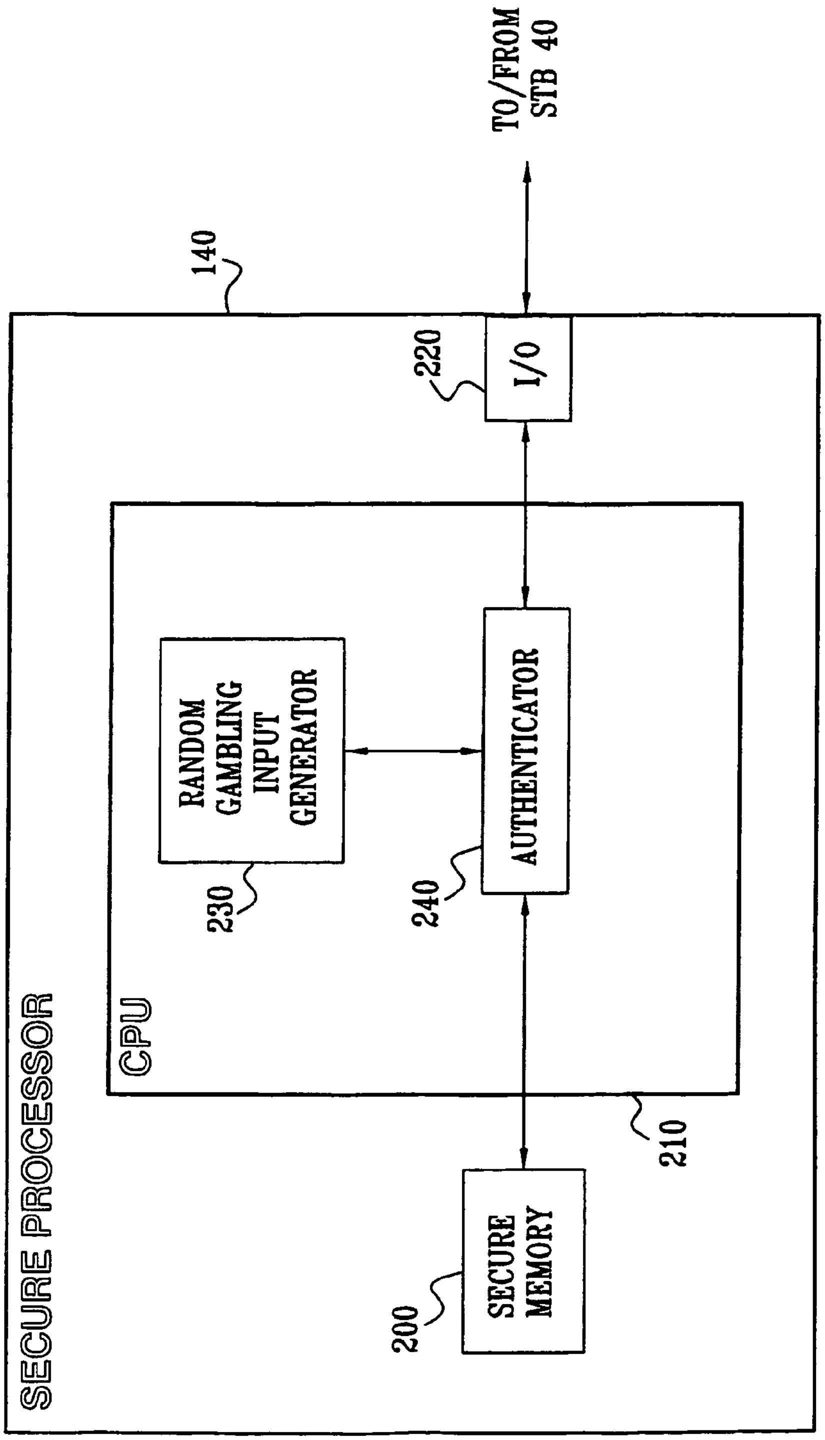
FIG. 2 is a simplified pictorial illustration of a secure processor associated with a subscriber unit in the system of FIG. 1, the secure processor being constructed and operative in accordance with a preferred embodiment of the present invention.

Reference is now additionally made to FIG. 2 which is a simplified pictorial illustration of the secure processor 140 constructed and operative in accordance with a preferred embodiment of the present invention.

The secure processor 140 preferably includes a secure memory 200, a central processing unit (CPU) 210, and an input/output (I/O) interface 220. The CPU 210 preferably includes a random gambling input generator 230 and an authenticator 240. The random gambling input generator 230 is preferably operative to randomly or pseudo-randomly generate gambling input to the offline interactive gambling application during execution of the offline interactive gambling application by the subscriber unit 30. Random and pseudo-random generation circuitry, suitable for implementing the random gambling input generator 230, are well known in the art. Examples of algorithms for random and pseudo-random input generation and generators and principles of generators therefor are described in the *Handbook of Applied Cryptography*, by Alfred J. Menezes, Paul C. van Oorschot and Scott A. Vanstone, CRC Press LLC, 1997, Chapter 5, the disclosure of which is hereby incorporated herein by reference.

The secure memory 200 is preferably operatively associated with the random gambling input generator 230, for example via the authenticator 240. The secure memory 200 is preferably operative to securely store information related to the execution of the offline interactive gambling application.

The authenticator 240 may preferably associate a digital signature or another suitable proof of authenticity with the information before transmitting the information via the I/O interface 220 to the STB 40 in order to prevent tampering with the information. Association of a digital signature or another suitable proof of authenticity with the information may take place, for example, prior to storage of the information in the secure memory 200, or at retrieval of the information from the secure memory 200.

It is appreciated that the secure processor 140 is preferably designed, as is well known in the art, to be tamper resistant and to forbid changes to any of its internal elements except in accordance with appropriate external commands. Accordingly, it is considered that a user is not normally able to successfully tamper with the secure processor 140 or any of its internal elements.

The operation of the apparatus of FIGS. 1 and 2 is now briefly described. In general, the headend 20, the subscriber unit 30 and the secure processor 140 cooperate to enable an offline interactive gambling application to be securely executed and its results to be verified. The offline interactive gambling application may include any appropriate interactive gambling application such as a game that is at least partially based on chance. The game may include, for example and without limiting the generality of the foregoing, one of the following games: a game of Poker; a game of Blackjack; and a Roulette game.

Cooperation among the headend 20, the subscriber unit 30 and the secure processor 140 is preferably implemented through the following three cooperating components: the offline interactive gambling application executed at the subscriber unit 30; a re-executed version of the offline interactive gambling application executed at the headend 20; and the secure processor 140. The re-executed version of the offline interactive gambling application preferably results from the headend 20 performing, through the processing unit 110, at least one of the following: a repeated execution of a portion of the offline interactive gambling application; a repeated execution of the entire offline interactive gambling application; and execution of a corresponding verification application that provides results identical, or substantially identical, to results obtained by execution of the offline interactive gambling application.

During execution of the offline interactive gambling application the user 120 is enabled to gamble interactively. Interaction of the user 120 during execution of the offline interactive gambling application is considered insecure because the user 120 may try to tamper with the application. Therefore, the secure processor 140 uses the random gambling input generator 230 to randomly or pseudo-randomly generate gambling input to the offline interactive gambling application during execution of the offline interactive gambling application. The gambling input is typically generated in accordance with gambling rules and instructions provided by the offline interactive gambling application resident in the subscriber unit 30. Since the secure processor 140 is tamper resistant, the user 120 is not normally able to successfully tamper with the gambling input generated by the secure processor 140 even if he succeeds in tampering with the offline interactive gambling application residing in the subscriber unit 30.

The user 120 preferably interacts with the offline interactive gambling application by, inter alia, responding to the gambling input through entering his decisions and selections via the remote control 130. The user decisions and selections are collectively referred to below as “user selections”. The user selections are normally entered during execution of the offline interactive gambling application.

The secure processor 140 also preferably uses the secure memory 200 to securely store information related to the execution of the offline interactive gambling application. The information preferably includes information from which at least one result of the offline interactive gambling application can be derived. In its basic form, the information may include a log of some of the user selections, or all the user selections. The information stored in the secure memory 200 may also preferably include a log of some of the gambling input, or all the gambling input, generated by the random gambling input generator 230 during execution of the offline interactive gambling application.

The number of logs that the secure memory 200 can hold may preferably be configurable by the headend 20. It is appreciated that the number of offline interactive gambling applications executable by the subscriber unit 30 is generally limited by the number of logs the secure memory 200 can hold.

Each log is preferably given a unique log identity by the secure processor 140. However, in a case where the information related to the execution of the offline interactive gambling application cannot be comprised in a single log and the logs are fixed-length logs, the secure processor 140 may preferably open a new log whenever a preceding log associated with the offline interactive gambling application reaches its end and additional information remains to be stored. In such a case, the new log is preferably given a log identity that is identical to a log identity of the preceding log.

It is appreciated that the secure processor 140 may also preferably delete, preferably under control of the headend 20, logs including information that has been indicated as related to cases in which execution of the offline interactive gambling application resulted in loss of the user 120 and thus clear such logs for reuse.

The following are, by way of example, some commands supported by the secure processor 140 for manipulating logs, generating the gambling input, and storing the information:

1. Start_New_Log—The secure processor 140 starts a new log.
2. Log_Decision—The secure processor 140 logs a value received from the offline interactive gambling application, the value representing a user selection of the user 120.
3. Generate_Random—The secure processor 140 generates a random number as part of the gambling input, logs it, and sends it to the offline interactive gambling application.
4. Clear_Log—The secure processor 140 clears a log for reuse. This command is accepted only if it comes from the headend 20. The secure processor 140 uses some appropriate method, such as digital signature verification, to authenticate that this command has indeed been sent by the headend 20.

In a case where the offline interactive gambling application is terminated prematurely, the secure processor 140 preferably allows the offline interactive gambling application to read its logs and to continue a log from where it had previously been stopped.

It is appreciated that since, as mentioned above, the information is stored in the secure processor 140 that is tamper resistant, the user 120 cannot normally modify the information. Also, since the information is associated with a digital signature or another suitable proof of authenticity, the user cannot normally transmit falsified information to the headend 20 which the headend 20 will interpret as authentic and correct.

The secure processor 140 may also create one or more secure backups of logs stored thereat on other available local storage devices, such as a non-volatile random access memory (NVRAM) in the STB 40 or a hard disk in the STB 40 (both not shown). The secure backups of the logs may be used in a case where the secure processor 140 becomes inactive after the secure backups have been created. The secure backups may preferably be made secure, for example, by associating the information in the logs with a digital signature. The secure backups may preferably be used to ensure that the user 120 can still provide proof of his winnings to the headend 20 in the case where the secure processor 140 becomes inactive.

In accordance with a preferred embodiment of the present invention the offline interactive gambling application may be associated with an entitlement to execute the offline interactive gambling application. Such entitlement may, for example, be transmitted to the secure processor 140 from the headend 20 in an entitlement management message (EMM) as is well known in the art. In such a case, the secure processor 140 may preferably refuse to open a log for the offline interactive gambling application unless such entitlement exists. Alternatively, the entitlement may be generated at the secure verification component in the headend 20 and used to determine whether the secure verification component must process a log associated with execution of the offline interactive gambling application.

After execution of the offline interactive gambling application is completed, the user 120 may be locally notified by the offline interactive gambling application of the at least one result. Local notification of the at least one result is preferably based on the user selections and the gambling input as read from the secure memory 200 and is preferably performed by a processor (not shown) in the STB 40. In this respect it is noted that the local notification provided by the STB 40 is not secure and the secure processor 140 cannot typically process the information to verify the at least one result and provide a secure local notification of the at least one result.

Since the local notification of the at least one result is not sufficient to securely determine correctness of the at least one result, the at least one result is not considered to be final until the information from which the at least one result is derived is validated. For this purpose, the information stored in the secure processor 140 is preferably transmitted to the headend 20 via the communication interface 70 and the telephone network. Since the information is associated with a digital signature or another suitable proof of authenticity, transmission of the information to the headend 20 can be considered secure.

It is appreciated that in the absence of a communication link for upstream transmission of the information to the headend 20, the user 120 may send the secure processor 140 by mail to the headend 20 or physically take the secure processor 140 to a dealer (not shown) who has appropriate means (not shown) to transmit the information to the headend 20.

At the headend 20, the information arriving from the secure processor 140 is preferably received at the central gambling facility communication interface 100 and checked by the processing unit 110 to derive and determine the at least one result of the offline interactive gambling application. For this purpose, the processing unit 110 preferably re-executes the offline interactive gambling application with the information received from the secure processor 140 replacing the gambling input actually generated and the user selections actually entered. Preferably, the processing unit re-executes the offline interactive gambling application by performing at least one of the following: a repeated execution of ai portion of the offline interactive gambling application; a repeated execution of the entire offline interactive gambling application; and execution of a corresponding verification application that provides results identical, or substantially identical, to results obtained by execution of the offline interactive gambling application.

The offline interactive gambling application re-executed in such a form is the re-executed version of the offline interactive gambling application mentioned above and it is preferably a secure application that is performed in a secure mode.

The secure application is thus similar to the offline interactive gambling application except that instead of interactively getting a sequence of user selections in response to gambling input, the secure application reads the sequence of user selections and the gambling input from logs received from the secure processor 140.

Preferably, prior to, during, or after execution of the secure application the logs received from the secure processor 140 may be checked for validity by the processing unit 110. The processing unit 110 may preferably use any appropriate method, such as checking a digital signature as is well known in the art, to authenticate the logs received from the secure processor 140. In a case where some of the logs are invalid, the processing unit 110 preferably informs an operator of the headend 20 of the invalid logs that it encounters.

It is appreciated that invalid logs may indicate an attempt to compromise the security of the gambling system 10. The processing unit 110 may also preferably statistically analyze the logs, prior to, during or after execution of the secure application, to identify improbable winning rates indicating fraud in the execution of the offline interactive gambling application or a compromise of the security of the gambling system 10. In this respect it is noted that if invalid logs are found or improbable winning rates are detected measures may preferably be taken against suspect secure processors that provide such invalid logs or reach such improbable winning rates. Such measures may include, for example, disabling the ability of the suspect secure processors to execute any gambling application, or disabling the ability of the suspect secure processors to execute offline interactive gambling applications and retaining the ability of the suspect secure processors to execute online interactive gambling applications.

It is further appreciated that in performing a statistical analysis, the processing unit 110 may refer not only to the logs received from the secure processor 140 but also to logs received from many other secure processors. In such a case, an improbable winning rate may be determined, for example, by detecting a sudden spike in winning rate of a single user or a plurality of users. In a case where such an improbable winning rate is determined, all secure processors are preferably disabled from performing any offline interactive gambling applications, and only online interactive gambling applications are enabled in which execution integrity can be monitored by the headend 20. Enabling of offline interactive gambling applications may resume, for example, only after all the secure processors are replaced.

Preferably, the processing unit 110 reads and checks the logs according to their log identity. If the offline interactive gambling application resulted in more than one log, all logs of the same offline interactive gambling application, which in fact have the same log identity as mentioned above, may be processed together. It is appreciated that the processing unit 110 will not typically process a log that it has already processed before.

Through re-execution of the offline interactive gambling application the processing unit 110 is thus able to securely derive and validate the at least one result of the offline interactive gambling application. It is appreciated that if security of the gambling system 10 were to be based only on security of the secure processor 140 without the headend 20 securely deriving and validating the at least one result, any compromise of the secure processor 140 or secure processors of other users could not be monitored and coped with.

The processing unit 110 may also preferably determine, based on the at least one result, winnings or losses of the user 120 resulting from execution of the offline interactive gambling application. Additionally, the processing unit 110 may generate indications of credit or debit for the user 120 in response to a determination of the winnings or losses respectively.

The indications of credit or debit together with a validated notice of the at least one result may preferably be transmitted to the subscriber unit 30 via the communication interface 100 and the telephone network. At the subscriber unit 30, the indications of credit or debit and the validated notice of the at least one result are preferably received via the communication interface 70 and displayed to the user 120 over the television 50. The user 120 is then preferably credited or debited as necessary.

The operation of the apparatus of FIGS. 1 and 2 is now further briefly described by referring to an example, which is not meant to limit the generality of the present application, of a game of Blackjack as the offline interactive gambling application that is executed in the gambling system 10. Persons skilled in the art will however realize that many other examples are possible and are contemplated within the scope of the present invention.

In this example, the user 120 plays a Blackjack application on the television 50 by using the remote control 130. The Blackjack application is executed by the STB 40 and the secure processor 140 is the smart card that provides conditional access to all television services, including the Blackjack application.

Preferably, when the user 120 turns on the Blackjack application, the Blackjack application sends a Start_New Log command to the secure processor 140 along with, typically, a game-type identification. Whenever the user 120 makes a user selection, such as a request for "dealing" another card, the Blackjack application sends a Log_Decision command to the secure processor 140 with a value representing the user selection. Whenever the Blackjack application needs randomness to be revealed to the user 120, for example a value of cards dealt to the user 120, the Blackjack application preferably sends a Generate_Random command to the secure processor 140 which generates gambling input to which the user 120 is expected to respond. When the Blackjack application determines that the game is over, it informs the user 120 the result of the game.

At some later time, the secure processor 140 may securely transmit a log with all user selections and gambling input to the headend 20. Based on this log, the headend 20 preferably securely re-executes the Blackjack application and determines and validates the result of the game. Based on the result of the game, the user 120 is preferably credited or debited as necessary, for example, by respectively transmitting from the headend 20 a credit or debit signal to the secure processor 140. The headend 20 may also preferably transmit a command to the secure processor 140 to clear the log associated with the Blackjack application so that this log can be overwritten.

An example of a sequence representing a play of a Blackjack application is shown in Appendix A which is incorporated herein.

It is appreciated that offline interactive gambling applications enabled by the gambling system 10 can be considered secure when the offline interactive gambling applications use some element of randomness or pseudo-randomness. In applications in which there is no inherent randomness, randomness can be artificially added. For example, for an offline interactive gambling application that includes a chess game, the offline interactive gambling application may randomly select a move from among several possible logical moves on a chess board. Such random selection may preferably be at least partially dependent on a random value read from the secure processor 140.

In a case where the gambling system 10 includes another suitable gambling system such as a telephone gambling system that employs a GSM cellular telephone network, the secure processor 140 may be implemented in the SIM card of a cellular telephone, the offline interactive gambling application may be executed by the cellular telephone, and the secure application may be executed at premises of a provider of cellular telephone services.

Figure 3:
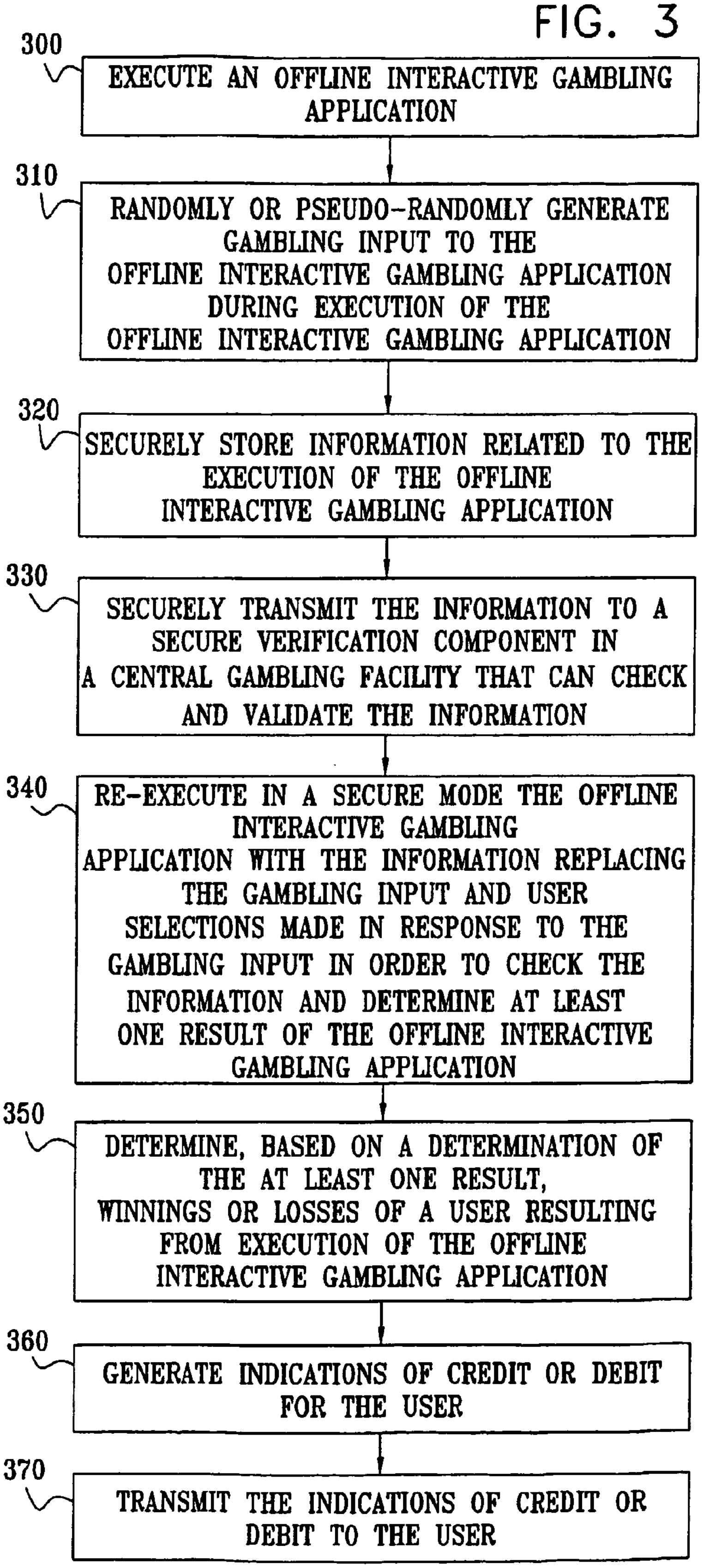
FIG. 3 is a simplified flowchart illustration of a preferred method of operation of the apparatus of FIGS. 1 and 2; and Appendix A is an example of a sequence representing a play of a Black jack application in the system of FIG. 1.

Reference is now made to FIG. 3 which is a simplified flowchart illustration of a preferred method of operation of the apparatus of FIGS. 1 and 2.

An offline interactive gambling application is preferably executed (step 300) in a non-secure unit, such as an STB. Gambling input to the offline interactive gambling application is preferably randomly or pseudo-randomly generated in a secure unit such as a smart card during execution of the offline interactive gambling application (step 310). Then, information related to the execution of the offline interactive gambling application is preferably securely stored (step 320), where the information includes information from which at least one result of the offline interactive gambling application can be derived. The information may be stored as one or more logs, where each log may preferably include some or all of the gambling input and some user selections, or all user selections, made by a user in response to the gambling input during execution of the offline interactive gambling application.

Preferably, the information is securely transmitted (step 330) to a secure verification component situated, for example, in a central gambling facility that can check and validate the information. At the central gambling facility, the information is preferably checked and the at least one result of the offline interactive gambling application is determined by re-executing (step 340), preferably in a secure mode, the offline interactive gambling application with the information replacing the gambling input actually generated and the user selections actually entered. Re-execution of the offline interactive gambling application preferably includes at least one of the following: repeating execution of a portion of the offline interactive gambling application; repeating execution of the entire offline interactive gambling application; and executing a corresponding verification application that provides results identical, or substantially identical, to results obtained by execution of the offline interactive gambling application.

Based on a determination of the at least one result, winnings or losses of the user resulting from execution of the offline interactive gambling application are preferably determined (step 350). Then, in response to the determination of the winnings or losses, indications of credit or debit for the user may preferably be generated (step 360) and transmitted (step 370) to the user.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

APPENDIX A

In this example, User represents the User, OFA represents the offline application, SP represents the secure processor and ONA represents the online application.

User→OFA
Start blackjack game
User→OFA
Bet 50 cents
OFA→SP
Start new log
SP
Log number=0002
OFA
Convert decision to representing number—450 (=Blackjack, bet 50 cents)
OFA→SP
Log Decision: 450

OFA→SP
Generate Random number
SP→OFA
Random number=1234
OFA
convert random number to two cards—7 and 6
OFA→User
You have a 7 and a 6. Do you want another card?
User→OFA
Yes
OFA
Convert decision to representing number—401 (=Take another card)
OFA→SP
Log Decision: 401
OFA→SP
Generate Random number
SP→OFA
Random number=9864
OFA
convert random number to one card—5
OFA→User
You have a 7, a 6 and a 5. Do you want another card?
User→OFA
No
OFA
Convert decision to representing number—402 (=Don't take another card)
OFA→SP
Log Decision: 402
OFA→SP
Generate Random number
SP→OFA
Random number=2382
OFA
convert random number to two cards—7 and King
OFA→User
Dealer has a 7 and a King. You've won 50 cents!

At this point, the log has the following information:
Log number: 0002
Decision: 450
Random number: 1234
Decision: 401
Random number: 9864
Decision: 402
Random number: 2382
SP sends the log to ONA
The ONA does the following:
ONA
Read log
Log→ONA
Log number: 0002
ONA
Check if Log is new.
Log→ONA
Log Decision: 450
ONA
Convert representing number to decision—450 (=Blackjack, bet 50 cents)
Log→ONA
Random number 1234
ONA
convert random number to two cards—7 and 6
Log→ONA
Log Decision: 401
ONA
Convert representing number to decision—401 (=Take another card)
Log→ONA
Random number=9864
ONA
convert random number to one card—5
Log→ONA
Log Decision: 402
ONA
Convert representing number to decision—402 (=Don't take another card)
Log→ONA
Random number=2382
ONA
convert random number to two cards—7 and King
ONA
User has won 50 cents.
ONA→SP
Clear log #0002

What is claimed is:

1. A secure offline interactive gambling system comprising:

a subscriber unit operative to insecurely store an offline interactive gambling application including all rules governing execution of the offline interactive gambling application, and, through interaction with a user, to execute the offline interactive gambling application; and a secure processor in or removably insertable in the subscriber unit so as to be operatively associated with the subscriber unit, the secure processor comprising:

a random gambling input generator operative to randomly or pseudo-randomly generate a gambling input to the offline interactive gambling application during execution of the offline interactive gambling application, and a secure memory operatively associated with the random gambling input generator, the secure memory being operative to securely store information related to the execution of the offline interactive gambling application, said information comprising information from which at least one result of the offline interactive gambling application can be derived, said information related to the execution of the offline interactive gambling application comprising:

a log of the gambling input generated during the execution of the offline interactive gambling application; and a log of at least some of the user selections made in response to the gambling input during the execution of the offline interactive gambling application; and a communication interface operatively associated with the subscriber unit and the secure processor, the communication interface being operative to securely transmit the information related to the execution of the offline interactive gambling application.

2. The system according to claim 1 and wherein said information related to the execution of the offline interactive gambling application comprises a log of all user selections made in response to said gambling input during execution of the offline interactive gambling application.

3. The system according to claim 1 and wherein said communication interface is also operative to receive indications of credit or debit.

4. The system according to claim 1 and wherein the subscriber unit comprises a set-top box (STB) and the secure processor is comprised in a removable security element.

5. The system according to claim 4 and wherein the removable security element comprises a smart card.

6. The system according to claim 1 and wherein the offline interactive gambling application comprises a game that is at least partially based on chance.

7. The system according to claim 6 and wherein the game comprises at least one of the following: a game of Poker; a game of Blackjack; and a Roulette game.

8. The system according to claim 1 and also comprising a central gambling facility operative to check said information and to decide said at least one result of the offline interactive gambling application.

9. The system according to claim 8 and wherein said central gambling facility is operative to check said information and to decide said at least one result by re-executing the offline interactive gambling application with said information replacing said gambling input and user selections made in response to said gambling input.

10. The system according to claim 9 and wherein said central gambling facility re-executes the offline interactive gambling application by performing at least one of the following: a repeated execution of a portion of the offline interactive gambling application; a repeated execution of the entire offline interactive gambling application; and execution of a corresponding verification application that provides results substantially identical to results obtained by execution of the offline interactive gambling application.

11. The system according to claim 9 and wherein said central gambling facility re-executes the offline interactive gambling application in a secure mode.

12. A secure offline interactive gambling method comprising performing the following steps at a location at which a user is present:

insecurely storing an offline interactive gambling application including all rules governing execution of the offline interactive gambling application;

executing the offline interactive gambling application through interaction with the user;

randomly or pseudo-randomly generating gambling input to the offline interactive gambling application during execution of the offline interactive gambling application;

securely storing information related to the execution of the offline interactive gambling application, said information comprising information from which at least one result of the offline interactive gambling application can be derived, said information related to the execution of the offline interactive gambling application comprising:

a log of the gambling input generated during the execution of the offline interactive gambling application; and a log of at least some of the user selections made in response to the gambling input during the execution of the offline interactive gambling application; and securely transmitting the information related to the execution of the offline interactive gambling application.

13. The method according to claim 12 and wherein said securely storing comprises securely storing a log of all user selections made in response to said gambling input during execution of the offline interactive gambling application.

14. The method according to claim 12 and also comprising receiving indications of credit or debit.

15. The method according to claim 12 and wherein the offline interactive gambling application comprises a game that is at least partially based on chance.

16. The method according to claim 15 and wherein the game comprises at least one of the following: a game of Poker; a game of Blackjack; and a Roulette game.

17. The method according to claim 12 and also comprising checking said information and deciding said at least one result of the offline interactive gambling application at a central gambling facility.

18. The method according to claim 17 and wherein said checking and said deciding comprise re-executing the offline interactive gambling application with said information replacing said gambling input and user selections made in response to said gambling input.

19. The method according to claim 18 and wherein said re-executing comprises at least one of the following: repeating execution of a portion of the offline interactive gambling application; repeating execution of the entire offline interactive gambling application; and executing a corresponding verification application that provides results substantially identical to results obtained by execution of the offline interactive gambling application.

20. The method according to claim 18 and wherein said re-executing comprises re-executing the offline interactive gambling application in a secure mode.

21. A secure offline interactive gambling system comprising:

subscriber unit means for insecurely storing an offline interactive gambling application including all rules governing execution of the offline interactive gambling application, and for executing the offline interactive gambling application through interaction with a user;

means in or insertable in the subscriber unit means for securely processing which comprise:

means for randomly or pseudo-randomly generating gambling input to the offline interactive gambling application during execution of the offline interactive gambling application, and means for securely storing information related to the execution of the offline interactive gambling application, said information comprising information from which at least one result of the offline interactive gambling application can be derived, said information related to the execution of the offline interactive gambling application comprising:

a log of the gambling input generated during the execution of the offline interactive gambling application; and a log of at least some of the user selections made in response to the gambling input during the execution of the offline interactive gambling application; and means for securely transmitting the information related to the execution of the offline interactive gambling application.

* * * * *